Patented Feb. 11, 1936

2,030,209

UNITED STATES PATENT OFFICE 2,030,209

ISOLATION AND PURIFICATION OF HORMONES

Frederick L. Hisaw and Harry L. Fevold, Madison, Wis., assignors to Wisconsin Alumni Research Foundation, Madison, Wis., a corporation of Wisconsin No Drawing. Application November 16, 1931, Serial No. 575,480. Renewed September 15, 1934

2 Claims. (Cl. 167—74)

This invention relates particularly to the method of extracting hormones from the anterior lobe of the hypophysis or pituitary gland and from other sources, and the extraction, isolation and purification from said sources of a single hormone which has the specific effect of prolonging the life and activity of the corpus luteum and to the product obtained by such method of treatment.

One object is to isolate and purify and to provide a method for the isolation and purification of this hormone which, because of its specific effect upon the growth of the corpus luteum, we have called the luteinizing hormone or luteinizer.

Another object is the extraction from the pituitary gland of a substance containing both this hormone and another of different physiological effect.

It has been known heretofore that there existed in the anterior lobe of the hypophysis of a mammal, in the placenta of a human being, and in the urine and blood of pregnant animals, a substance or substances responsible for the growth of the Graafian follicles, ovulation, stimulation of endocrine activities of the testis, prolongation of the life of the corpus luteum, and the promotion of conditions typical of pregnancy in the uterus and mammary glands, coupled with absence of oestrum. We have succeeded in extracting from the anterior lobe of the hypophysis or pituitary gland, and from other sources, two hormones which, in combination, give the results and have the effects above mentioned, but which, when isolated one from the other, have each their characteristic effects. One of these hormones we have called the luteinizing hormone or luteinizer because of its specific effect upon the corpus luteum. The extraction of the two hormones in combination, and the isolation of the luteinizing hormone is the subject matter of this application. The other of the two hormones because of its effect upon the reproductive glands, we have called the gonad stimulator and have made it and its method of extraction and isolation and purification, the subject matter of an application Ser. No. 575,481, filed November 16, 1931.

Pituitary glands as a source of the hormones may be obtained from slaughter houses, from the bodies of sheep, cattle and swine. The blood and urine of pregnant animals, and the placenta of the human being, may likewise be used as sources from which to extract the hormones and to isolate this hormone. Whatever the source, the method of extraction and isolation is the same.

If the pituitary gland is used, it is first ground and dried whole. It is not necessary to separate the anterior lobe from the rest of the gland because the remainder, under our method of isolation and extraction, does not affect the results in any way. However, only the anterior lobe is potent and, if desired, it may be segregated. The dried pituitary gland is extracted for twenty-four hours with 50% aqueous pyridine as a solvent. The insoluble material is centrifuged off and the pyridine extract is evaporated to dryness.

If then the solute is emulsified in distilled water and this emulsion is injected into immature female rats, it has the effect of opening the vagina of the rat prematurely, causing follicular growth in the ovary, and completely luteinizes the growing follicles. The presence of both hormones is thus shown. The pyridine extract emulsion is equal in activity to the anterior lobe of the pituitary before extraction.

The dried pyridine extract is then leached with freshly distilled water and completely freed from water insoluble material by centrifuging. The water solution has some of the properties of the whole pyridine extract, but not all. The water solution still retains quantitively its power of opening the vagina and causing follicular growth but does not have the property of luteinizing the follicles as before. However, if united again to the water insoluble residue and then injected into immature female rats, the results are obtained entirely similar to the original whole pyridine extract. We have, therefore, separated, as far as practical purposes are concerned, the luteinizing hormone and the gonad stimulating hormone. The water insoluble residue contains most of the luteinizing hormone.

If desired there may be used, instead of pyridine as a solvent to extract hormones from the containing animal matter, other weak bases of similar hydrogen ion concentration.

The luteinizing hormone does not produce sexual precocity; it does not stimulate the follicles in the ovary nor testicular activity as does the gonad stimulator. Its action is that of prolonging the life and activities of the corpus luteum. By such action, it promotes conditions typical of pregnancy, in the uterus and mammary glands of pregnancy, or we may speak of the animal as being pseudopregnant. Associated with this condition is an absence of oestrum and the animal remains in a non-oestrus condition typical of pregnancy.

The luteinizing hormone is insoluble or nearly so in neutral solvents such as ether, alcohol and water. It is soluble in alkaline solutions such as 1% ammonium hydroxide and weak concentrations of the strong alkalies.

The luteinizing hormone may be useful in any medical situation where it is necessary to promote the growth of corpora lutea in the ovary such as over-development of the follicles promoting long continued menstruation. The follicles may be luteinized by the hormone and the situation relieved, or the hormone may be useful in promoting the continuance of pregnancy where there is a failure of lutein tissue.

What we regard as new and desire to secure by Letters Patent is:

1. As a product, a hormone derived from the pituitary gland of animals and having the property, when administered, of luteinizing the follicles and prolonging the life of corpora lutea, said hormone being free of impurities substantially insoluble in water, but readily soluble in aqueous alkaline and acids and insoluble in all common organic solvents, and in form usable for therapeutic purposes.

2. The method of producing luteinizing hormones from the pituitary gland of animals which consists in comminuting and drying said gland matter, subjecting said dried matter to aqueous pyridine to extract the portions of said gland matter soluble in aqueous pyridine, drying said extract, and separating from said extract the water soluble impurities by subjecting said extract to water, to leave a residue having the properties of luteinizing the follicles and prolonging the life of corpora lutea.

FREDERICK L. HISAW.
HARRY L. FEVOLD.